Oct. 28, 1930. C. SCHMITZ 1,779,893
EXPANDIBLE VALVE OBTURATOR
Filed Nov. 28, 1927 2 Sheets-Sheet 1
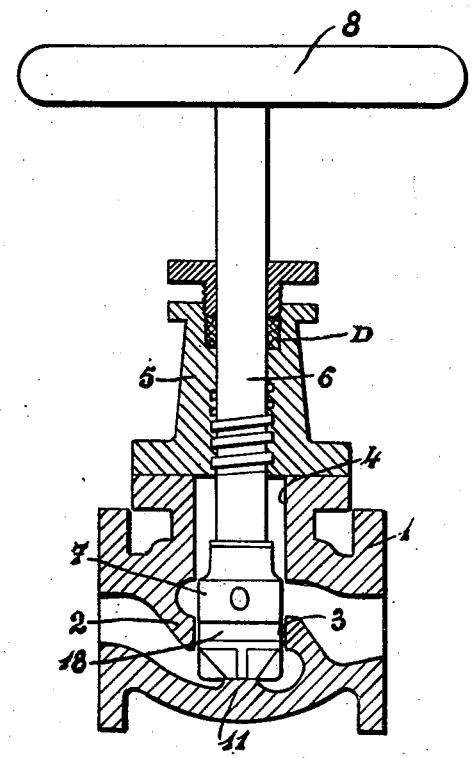
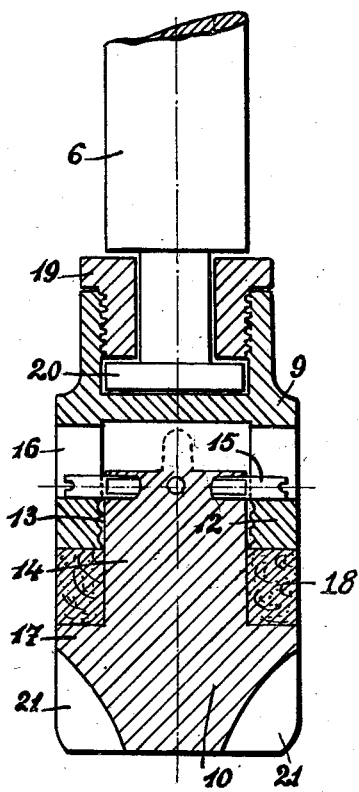
INVENTOR
C. SCHMITZ Oct. 28, 1930.   C. SCHMITZ   1,779,893
EXPANDIBLE VALVE OBTURATOR
Filed Nov. 28, 1927   2 Sheets-Sheet 2

INVENTOR
C. SCHMITZ,

Patented Oct. 28, 1930

1,779,893

UNITED STATES PATENT OFFICE

CHARLES SCHMITZ, OF LA LOUVIERE, BELGIUM

EXPANDIBLE VALVE OBTURATOR

Application filed November 28, 1927, Serial No. 236,249, and in Luxemburg August 5, 1927.

This invention has for its object a valve adaptable to any piping used to convey either steam, gas or fluids, and its advantages lie in its being tighter than those of ordinary types, at same time requiring less upkeep than they do and enabling the operator to easily substitute a fresh packing to replace that of the threaded spindle, subject to no stopping of the valve motion.

The present valve comprises a body the inside of which is exactly designed like an ordinary valve, excepting the seat which, in the present device, is replaced by a mere continuation of the cylindrical canal which serves for sliding of the actual valve member: this latter has the shape of a piston one part of which is expandible, i. e. gets so enlarged, one or the other way, on the obturating member reaching the end of its stroke (on or back) as to provide for an hermetical obturation of the cylindrical opening, thus preventing any flow of fluid through the valve. For that purpose, this obturating piston consists of two parts which are rigid but can slide in one another, and between which the above mentioned expandible member has been inserted; this member is a ring which is made of any resilient material and gets axially pressed between the two rigid parts whenever the piston abuts against a salient protruding from the bottom of the valve body, with the result of getting transversely expanded and thereby getting tightly pressed against the whole internal periphery of said cylindrical opening of the valve body and providing for an hermetical obturation.

The accompanying drawings show, by way of examples, two embodiments of the invention, say:

Fig. 1, a view of the valve being closed and having the greater part of its mechanism shown in vertical section, the control handle being seen in elevational view;

Fig. 2, is a corresponding view, on a larger scale, of the efficient portion of its obturating member shaped as a piston.

These two figures refer to a first embodiment of the invention.

Figure 3:
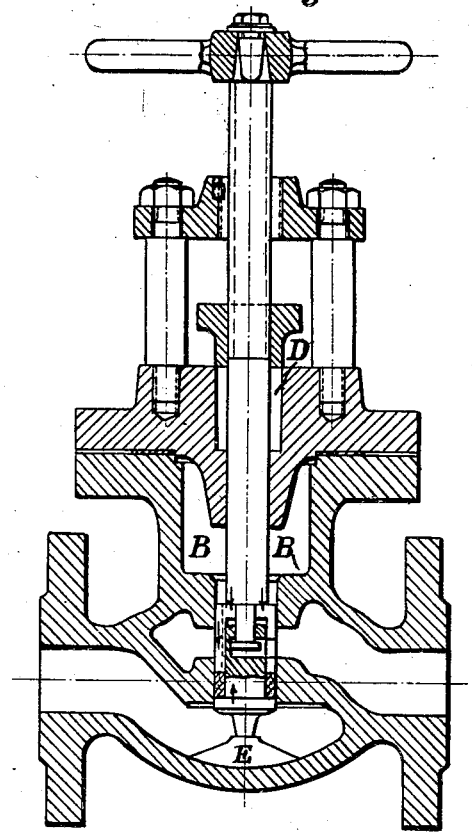
Figure 4:
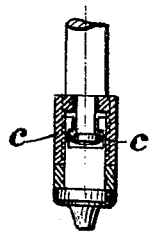
Figure 5:

The remaining views show an example of a second way of carrying out the invention, namely:

Fig. 3, a vertical section of the whole assembly;

Fig. 4, a detail view referring to the adaptation of the piston-shaped obturator;

Fig. 5, the corresponding projection upon a horizontal plane.

In the first of these embodiments, the valve body 1 has been divided into two chambers by a middle passage 2 wherein a cylindrical opening 3 is so cut as to have same axis as the bore 4 of the valve, the upper part thereof being closed by means of a cap 5 of ordinary type wherein the obturator stem 6 has been screwed, said piston-shaped obturator being capable of moving up and down inside the bore 4 (whose extension consists of the opening 3) whenever the control handle keyed upon the valve stem and seen at 8 is turned by the operator.

According to this invention, the obturating member 7 consists of two metal parts 9 and 10 whereof the second named (the lower one) will slide inside the first named as soon as the obturating member has descended such an amount as to cause said part to strike against a salient 11 protruding from the bottom of the lower chamber of the valve body 1. For the purpose, the lower portion of part 9 is shaped as a cylindrical socket 12 provided with grooves 13 for securing a tight fit; the upper cylindrical portion 14 of part 10 penetrates into that socket 12, and the parts 10 and 9 are fastened together by means of dowel pegs 15 which are screwed in the cylinder 14 and can slide in the holes 16 of the socket 12.

Between the lower edge of this socket 12 and a shoulder 17 of the part 10 there is a resilient ring 18 whose diameter is normally equal to that of the two rigid parts, but grows larger as a result of the transverse expansion undergone by the ring on being axially pressed in between these two rigid parts 9 and 10 of the obturator.

The stem 6 is secured to the obturator 7 by means of a nut 19 to be screwed into the upper portion of the part 9 in such a manner as to keep the stem end 20 quite enclosed this end being of larger diameter so as to abut against, and drive on, the obturator, and cause it to partake of the motion of stem 6 in its rectilinear but not in its rotatory movement; i. e., the stem 6 can rotate independently of the obturator 7 while causing the latter to ascend or descend with it, according to the direction the handwheel is turned in. In the upper portion of its stroke, the obturator 7 is guided along the cylindrical opening of 3 of the valve body by means of flaps or wings 21 protruding from the lower portion of part 10 round a conical portion the latter ends in.

As soon as the obturating member 7 will have reached the top of its stroke within bore 4 the valve will give the gas (or other fluid) free escape and, to regulate the flow, the operator has but to turn the handwheel 8 as usual, in order that the obturator may penetrate more or less into the opening 3, the fluid finding its way between the wings 21. On the bottom end of the obturator abutting against the salient 11 at the bottom of the valve body the part 10 will slide into the part 9 and the pressure thus exerted upon the resilient ring 18 will cause it to expand in a transverse direction and thus heavily press against the whole internal periphery of the cylindrical opening 3, thereby causing the latter to get into so intimate a contact with the dilatable ring as to secure a tight fit, subject to no considerable effort of the operator acting upon his handwheel 8, and irrespective of the pressure of the fluid in the pipe which leads on to the valve.

It should be noted that, in the case of valves designed as usual, serious drawbacks derived from the wear of the parts, these being not worn to an equal extent at all of their points, on account of which, to have them rectified and made accurate again, many a grinding, and many a loss of time, were unavoidable. Therefore, if using the valve designed according to this invention a great advantage will derive from its having only one part subject to wear; a part which, moreover, can be easily replaced within a few minutes, since the obturating member can be readily taken off by the operator, which has not to devote any time to dealing with the valve body.

As to the second embodiment, illustrated in Figs. 3, 4 and 5, it is, on the main, similar to the one just described, the only alteration lying in the provision of one or more grooves hollowed out of the upper part of the obturator to give passage to the flow of gas (or other fluid) squeezed from the upper portion by the obturator in its upstroke. Such grooves which are indicated at C in Fig. 4 can be either integrally cast with the obturating member or be cut out from same; in any case, on this member reaching the top of its stroke the obturation obtained is sufficient to allow interchangeability of the packing D subject to no stopping of the valve motion.

Moreover, the obturating action is based upon the same principle as in the first embodiment, and lies in the pressure or squeezing of a ring made of some resilient substance thus squeezed between the two telescoping parts of said obturator. At the bottom end of the obturator stroke the obturation will prevent the fluid from traversing the valve. As the threaded stem gets down, it drives the upper part of the obturator into its lower part which latter strikes against the shoulder. On the other hand, at the top point of its stroke, the obturator will cut the space B from the fluid pressure traversing the valve, and will permit of interchanging the packing D without having to first stop the valve motion. The threaded stem secured to the lower part of the obturator acts to draw along that lower part in its ascending stroke so as to drive it into the upper part which is rendered stationary by the valve cap, thus resulting in a compression of the resilient ring and in the obtention of a complete tightness.

An important feature of this invention lies in that it is never necessary to take the valve body off the piping, since it does not comprise any member requiring interchange or upkeep.

It is obvious that the embodiments of the invention which have been described above, do not restrict the scope of the invention, which generally speaking comprises all of the modified forms of execution designed after the above stated principle.

Having thus described and ascertained the subject-matter of my said invention and in what manner the same is to be performed, I declare that what I claim as new, and desire to secure by Letters Patent, is:—

A valve comprising a body having a cylindrical bore, an obturating member having an upper and lower part movable relative to each other, said upper part being formed with a hollow cylindrical bore and communicating side slots, said lower part being slidable in the bore of said upper, a resilient packing between the two parts, whereby upon movement of the member the lower part is brought into contact with the packing and compresses the packing to form a liquid seal, and pins extending thru the slots of the upper part and secured to the lower part to limit the movement of the lower part.

In testimony whereof I have affixed my signature.

CHARLES SCHMITZ.